United States Patent
Dantuluri (10) Patent No.: US 12,112,180 B2
(45) Date of Patent: *Oct. 8, 2024

(54) SYSTEM AND METHOD FOR AUTOMATIC GENERATION AND MANAGEMENT OF FEATURE LEVEL APPLICATION DIRECTORY

(71) Applicant: BANK OF AMERICA CORPORATION, Charlotte, NC (US)

(72) Inventor: Indradeep Dantuluri, Harrisburg, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,967

(22) Filed: Sep. 22, 2023

(65) Prior Publication Data

US 2024/0012656 A1 Jan. 11, 2024

Related U.S. Application Data

(63) Continuation of application No. 17/496,830, filed on Oct. 8, 2021, now Pat. No. 11,797,316.

(51) Int. Cl.
*G06F 9/445* (2018.01)
*G06F 8/71* (2018.01)
(Continued)

(52) U.S. Cl.
CPC ...... *G06F 9/44584* (2013.01); *G06F 9/44578* (2013.01); *G06F 9/451* (2018.02)

(58) Field of Classification Search
CPC ........ G06F 9/44584; G06F 8/427; G06F 8/45; G06F 8/433; G06F 9/4881; G06F 9/451;
(Continued)

(56) References Cited

U.S. PATENT DOCUMENTS 5,319,542 A 6/1994 King, Jr. et al.
5,890,175 A 3/1999 Wong et al.
(Continued)

FOREIGN PATENT DOCUMENTS

KR 1020020066869 A 8/2002

*Primary Examiner* — Thuy Dao
(74) *Attorney, Agent, or Firm* — Moore & Van Allen PLLC; Nicholas C. Russell (57) ABSTRACT

Embodiments of the present invention provide a system for automatically generating and managing application directories of one or more applications associated with an entity. The system is configured for identifying initiation of packaging of one or more program codes associated with at least one application, scanning the one or more program codes to identify one or more parameters associated with the one or more program codes, and automatically generating an application directory associated with the at least one application based at least on the one or more parameters identified by scanning the one or more program codes, wherein the one or more parameters comprise one or more dependencies, one or more screens, one or more permissions, one or more services, one or more navigational parameters, one or more base classes, one or more logging frameworks, and one or more static analyzers.

20 Claims, 5 Drawing Sheets

(51) Int. Cl.
*G06F 9/451* (2018.01)
*G06F 9/455* (2018.01)
*G06F 9/48* (2006.01)
*G06F 15/16* (2006.01)

(58) Field of Classification Search
CPC .......... G06F 8/73; G06F 8/75; G06F 9/44578; G06F 8/60; G06F 11/30; G06F 16/972; G06F 16/9566; G06F 16/176; G06F 8/61; G06F 3/0482; G06F 8/658; G06F 16/40; G06F 16/2329; G06F 16/211; G06F 16/27; G06F 16/283; G06F 16/289; G06F 16/214; H04L 67/34; H04L 63/1433
See application file for complete search history.

(56) References Cited

U.S. PATENT DOCUMENTS

| | | |
|---|---|---|
| 5,948,058 A | 9/1999 | Kudoh et al. |
| 6,072,481 A | 6/2000 | Matsushita et al. |
| 6,334,115 B1 | 12/2001 | Kuribayashi et al. |
| 6,687,557 B2 | 2/2004 | Ouchi |
| 7,356,492 B2 | 4/2008 | Hazi et al. |
| 7,545,941 B2 * | 6/2009 | Sovio .................... H04L 67/04 726/22 |
| 8,114,596 B2 | 2/2012 | Kaufman |
| 10,452,366 B2 * | 10/2019 | Daniel .................... G06F 8/36 |
| 10,467,592 B2 | 11/2019 | Pereira et al. |
| 2004/0083135 A1 | 4/2004 | Chau |
| 2004/0148232 A1 | 7/2004 | Fushimi et al. |
| 2004/0153512 A1 | 8/2004 | Friend |
| 2010/0043016 A1 | 2/2010 | Anzai |
| 2011/0010759 A1 | 1/2011 | Adler |
| 2011/0185354 A1 | 7/2011 | Tanner et al. |
| 2011/0252415 A1 | 10/2011 | Ricci |
| 2012/0129503 A1 | 5/2012 | Lindeman et al. |
| 2012/0210443 A1 | 8/2012 | Blaisdell et al. |
| 2013/0095785 A1 | 4/2013 | Sadana et al. |
| 2021/0064417 A1 | 3/2021 | Jiang et al. |

\* cited by examiner

SYSTEM AND METHOD FOR AUTOMATIC GENERATION AND MANAGEMENT OF FEATURE LEVEL APPLICATION DIRECTORY

CROSS-REFERENCE TO RELATED APPLICATION(S)

This application is a continuation application of and claims priority to U.S. patent application Ser. No. 17/496,830 filed on Oct. 8, 2021, and of the same title; the contents of which are also incorporated herein by reference.

BACKGROUND

Conventional systems do not have the capability to generate and manage directories for one or more applications associated with an entity. As such, there exists a need for a system that automatically generates and manages application directories of one or more applications at feature level.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for automatically generating and managing application directories of one or more applications associated with an entity. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of packaging of one or more program codes associated with at least one application, scans the one or more program codes to identify one or more parameters associated with the one or more program codes, automatically generates an application directory associated with the at least one application based at least on the one or more parameters identified by scanning the one or more program codes, wherein the one or more parameters comprise one or more dependencies, one or more screens, one or more permissions, one or more services, one or more navigational parameters, one or more base classes, one or more logging frameworks, and one or more static analyzers, and generates a user interface to display the application directory to one or more users.

In some embodiments, the present invention identifies the one or more dependencies associated with the one or more program codes of the at least one application, identifies the one or more screens associated with the one or more program codes of the at least one application, identifies the one or more permissions associated with the one or more program codes of the at least one application, identifies the one or more services that are being added to the at least one application, via the one or more program codes, identifies the one or more navigational parameters associated with the one or more program codes of the at least one application, and identifies the one or more base classes, the one or more logging frameworks, and the one or more static analyzers associated with the one or more program codes to monitor analytics of the at least one application.

In some embodiments, the present invention extracts one or more screenshots associated with the one or more screens and inserts the one or more screenshots into the one application directory.

In some embodiments, the present invention identifies the one or more permissions based on accessing one or more manifest files associated with the one or more program codes.

In some embodiments, the one or more navigational parameters comprise entry points and landing screens to one or more modules of the at least one application.

In some embodiments, the present invention updates the application directory based on a second initiation of packing of a second set of program codes associated with the at least one application.

In some embodiments, the generation of the application directory is completed in parallel to the packaging of the one or more program codes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that develops one or more applications for performing one or more organizational activities associated with the entity or a third party entity. In some embodiments, the entity may be a financial institution which may include herein may include any financial institutions such as commercial banks, thrifts, federal and state savings banks, savings and loan associations, credit unions, investment companies, insurance companies and the like.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access, develop, manage, maintain, test, and/or use one or more applications provided by the entity and/or the system of the present invention. In some embodiments, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, an entity may develop and/or use one or more applications to perform one or more organizational activities. However, such applications may be small in the initial stages of development and/use, but as time elapses new features will be built on the applications, thereby making the applications very complex and enormous (e.g., with more than 10,000 screens, or the like). During the course of development over a period of time, it will be difficult to keep track of all features associated with the applications and other information associated with the information. For example, if a new development requirement is received that depends on knowing if certain functionalities/features already exist within the application, there is no definite way to know or estimate it. If such parameters are estimated and new features are developed based on those estimations, there is always a possibility that the new features will have to be redeveloped if the estimations are not accurate, thereby reducing the efficiency of systems/servers the applications are running on. As such, there exits a need for a system that automatically identifies one or more functionalities and other information associated with one or more applications associated with an entity and generates and manages one or more directories associated with the one or more applications. The system of the present invention solves the above problems as discussed in detail below.

Figure 1:
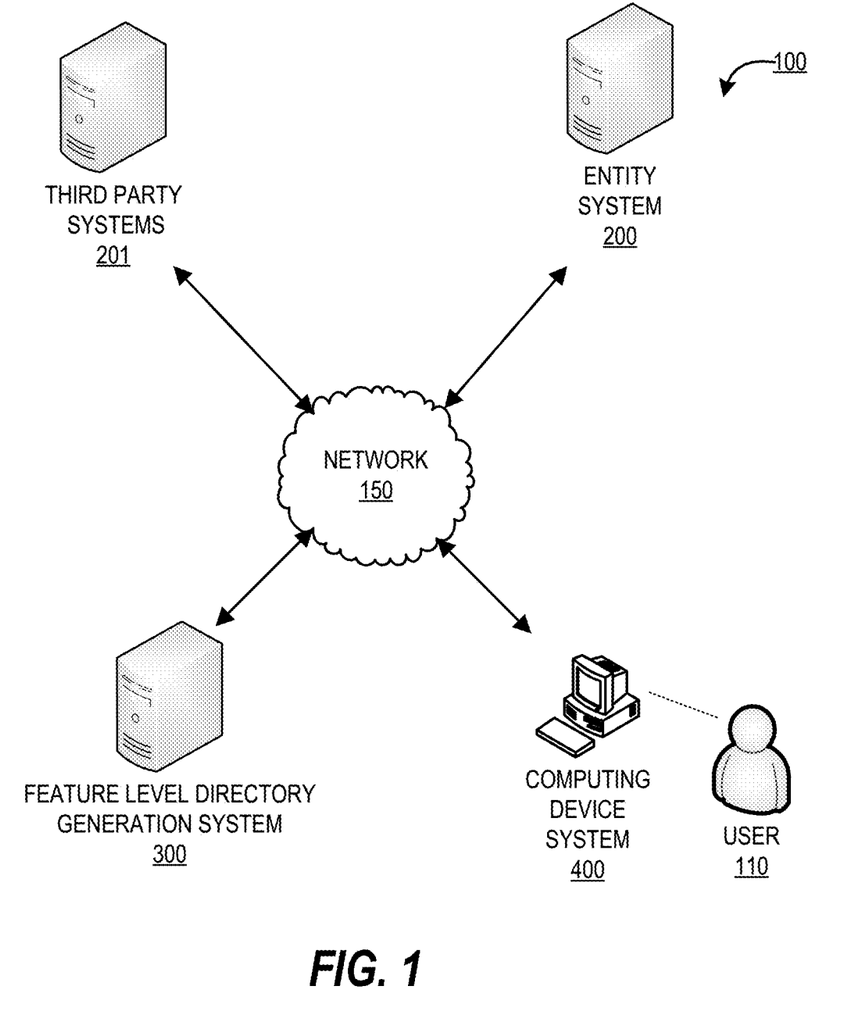
FIG. 1 provides a block diagram illustrating a system environment for automatically generating and managing application directories of one or more applications associated with an entity, in accordance with an embodiment of the invention.

FIG. 1 provides a block diagram illustrating a system environment 100 for automatically generating and managing application directories of one or more applications associated with an entity, in accordance with an embodiment of the invention. As illustrated in FIG. 1, the environment 100 includes a feature level directory generation system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, managers, application testers, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that develops and/or utilizes one or more entity resources to perform one or more organizational activities. The one or more third party systems 201 may be systems that facilitate any external third party applications that the entity may use to support, process, and/or develop the one or more applications. In one embodiment of the invention, the third party system may be a system that provides a Continuous Integration and Continuous Deployment tool to the system of the present invention.

The feature level directory generation system 300 is a system of the present invention for performing one or more process steps described herein. In some embodiments, the feature level directory generation system 300 may be an independent system. In some embodiments, the feature level directory generation system 300 may be a part of the entity system 200.

The feature level directory generation system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the feature level directory generation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the feature level directory generation system 300, and/or entity system 200 across the network 150.

Figure 2:
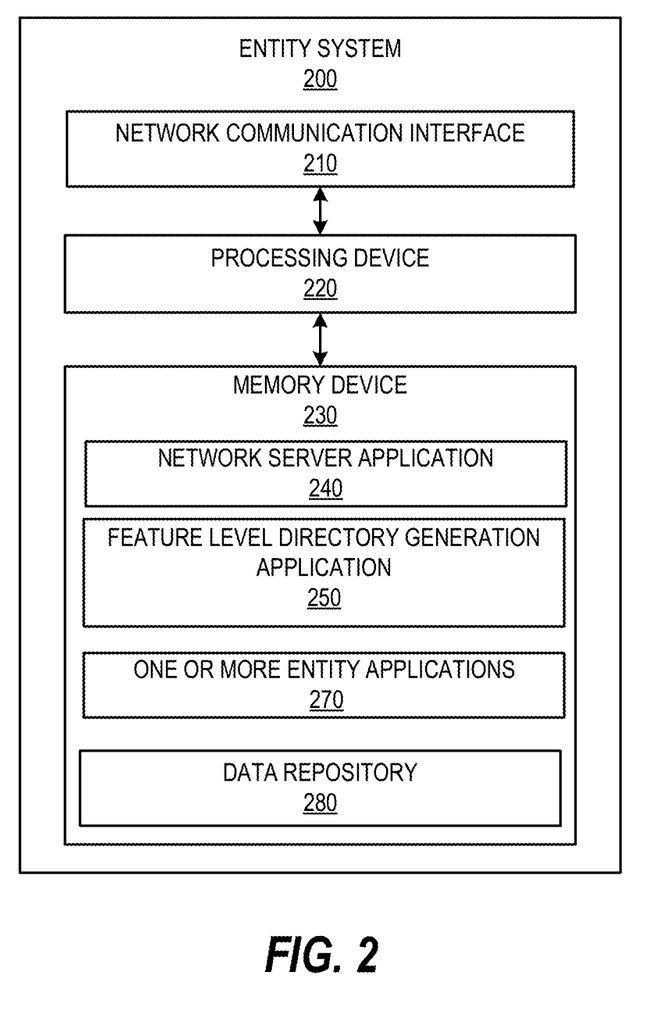
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a feature level directory generation application 250, one or more entity applications 270, and a data repository 280 comprising historical activity data associated with the entity and data accessed, retrieved, and/or computed by the entity system 200. The one or more entity applications 270 may be any applications developed, supported, maintained, utilized, and/or controlled by the entity. The computer-executable program code of the network server application 240, the feature level directory generation application 250, the one or more entity application 270 to perform certain logic, data-extraction, and data-storing functions of the entity system 200 described herein, as well as communication functions of the entity system 200.

The network server application 240, the feature level directory generation application 250, and the one or more entity applications 270 are configured to store data in the data repository 280 or to use the data stored in the data repository 280 when communicating through the network communication interface 210 with the feature level directory generation system 300, and/or the computing device system 400 to perform one or more process steps described herein. In some embodiments, the entity system 200 may receive instructions from the feature level directory generation system 300 via the feature level directory generation application 250 to perform certain operations. The feature level directory generation application 250 may be provided by the feature level directory generation system 300. The one or more entity applications 270 may be any of the applications used, created, modified, facilitated, developed, and/or managed by the entity system 200.

Figure 3:
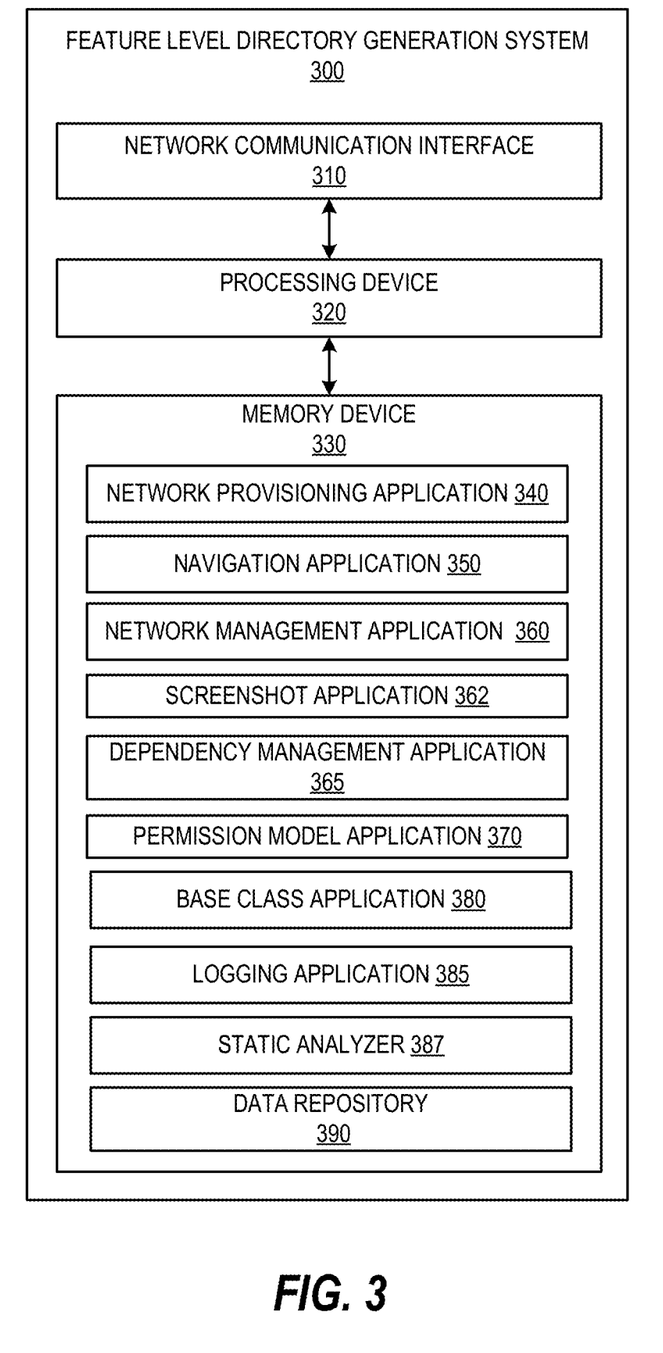
FIG. 3 provides a block diagram illustrating a feature level directory generation system 300 of FIG. 1, in accordance with an embodiment of the invention.

FIG. 3 provides a block diagram illustrating the feature level directory generation system 300 in greater detail, in accordance with embodiments of the invention. As illustrated in FIG. 3, in one embodiment of the invention, the feature level directory generation system 300 includes one or more processing devices 320 operatively coupled to a network communication interface 310 and a memory device 330. In certain embodiments, the feature level directory generation system 300 is operated by an entity, such as a financial institution. In other embodiments, the feature level directory generation system 300 is operated by a non-financial institution. In some embodiments, the feature level directory generation system 300 is owned or operated by the entity of the entity system 200. In some embodiments, the feature level directory generation system 300 may be an independent system. In alternate embodiments, the feature level directory generation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the feature level directory generation system 300 described herein. For example, in one embodiment of the feature level directory generation system 300, the memory device 330 includes, but is not limited to, a network provisioning application 340, a navigation application 350, a network management application 360, a screenshot application 362, a dependency management application 365, a permission model application 370, a base class application 380, a logging application 385, a static analyzer 387, and a data repository 390 comprising any data processed or accessed by one or more applications in the memory device 330. The computer-executable program code of the network provisioning application 340, the navigation application 350, the network management application 360, the screenshot application 362, the dependency management application 365, the permission model application 370, the base class application 380, the logging application 385, and the static analyzer 387 may instruct the processing device 320 to perform certain logic, data-processing, and data-storing functions of the feature level directory generation system 300 described herein, as well as communication functions of the feature level directory generation system 300.

The network provisioning application 340, the navigation application 350, the network management application 360, the screenshot application 362, the dependency management application 365, the permission model application 370, the base class application 380, the logging application 385, and the static analyzer 387 are configured to invoke or use the data in the data repository 390 when communicating through the network communication interface 310 with the entity system 200, and/or the computing device system 400. In some embodiments, the network provisioning application 340, the navigation application 350, the network management application 360, the screenshot application 362, the dependency management application 365, the permission model application 370, the base class application 380, the logging application 385, and the static analyzer 387 may store the data extracted or received from the entity system 200, and the computing device system 400 in the data repository 390. In some embodiments, the network provisioning application 340, the navigation application 350, the network management application 360, the screenshot application 362, the dependency management application 365, the permission model application 370, the base class application 380, the logging application 385, and the static analyzer 387 may be a part of a single application (e.g., modules).

Figure 4:
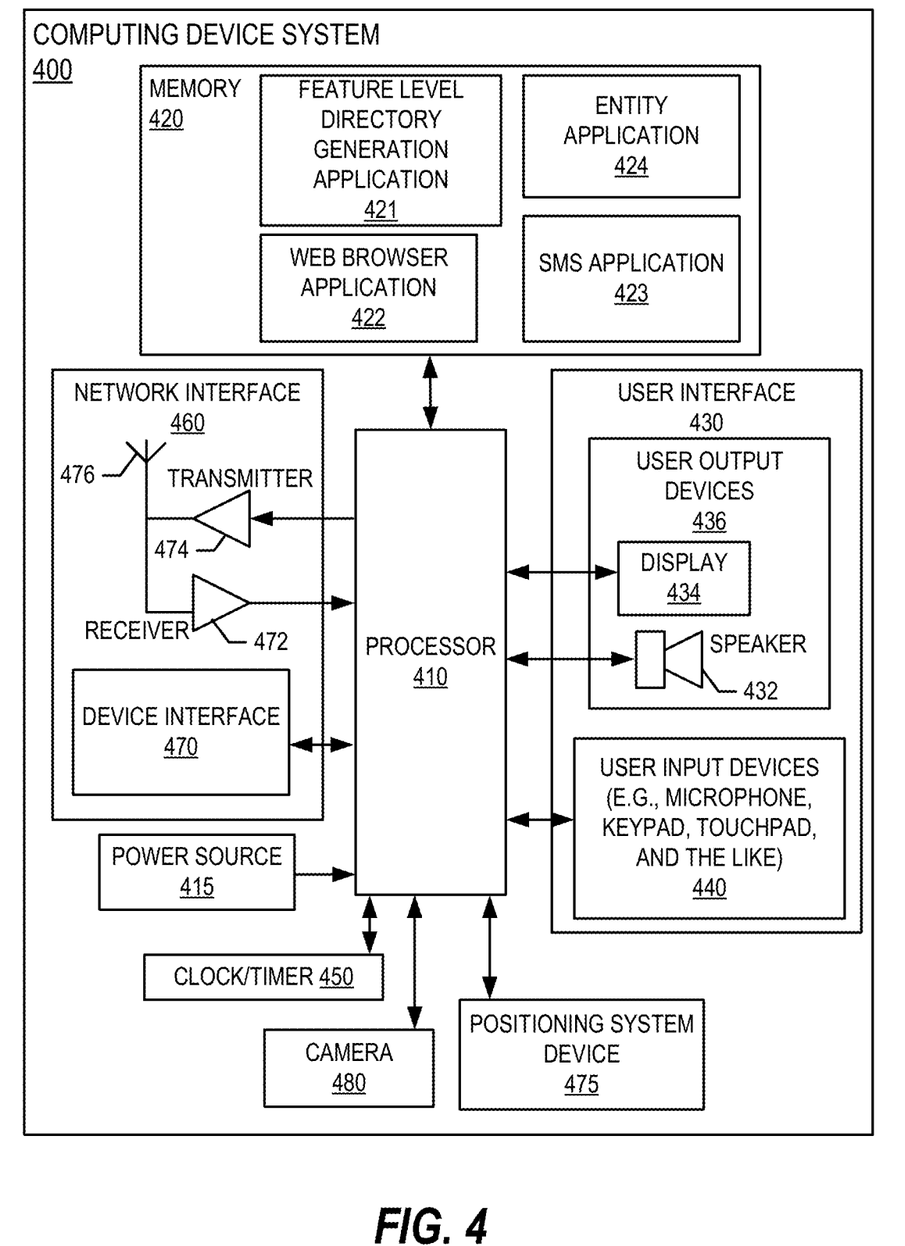
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a feature level directory generation application 421, entity application 424. These applications also typically instructions to a graphical user interface (GUI) on the display 430 that allows the user 110 to interact with the entity system 200, the feature level directory generation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the feature level directory generation application 421 provided by the feature level directory generation system 300 allows the user 110 to access the feature level directory generation system 300. In some embodiments, the entity application 424 provided by the entity system 200 and the feature level directory generation application 421 allow the user 110 to access the functionalities provided by the feature level directory generation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
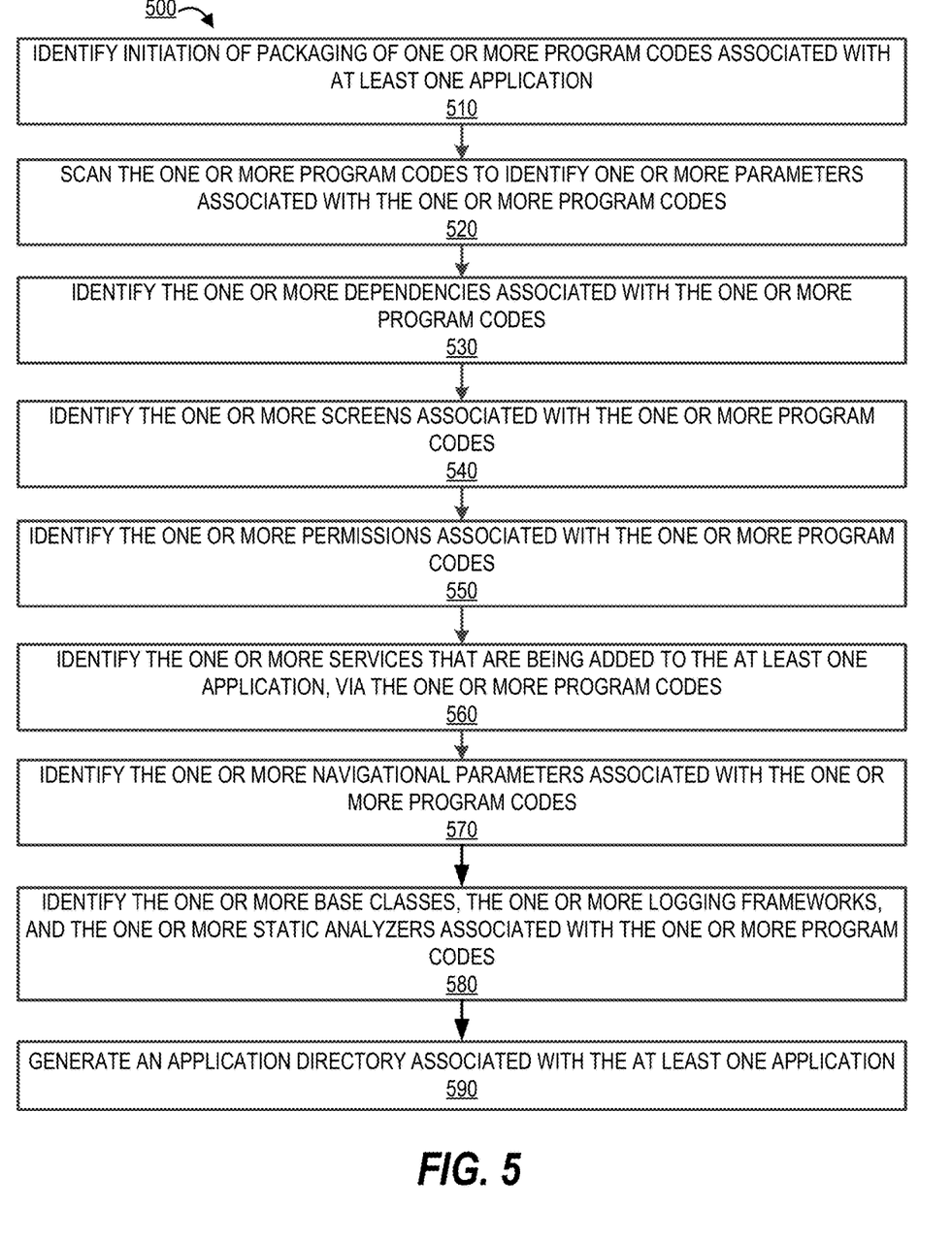
FIG. 5 provides a process flow for automatically generating and managing application directories of one or more applications associated with an entity, in accordance with an embodiment of the invention.

FIG. 5 provides a flowchart 500 illustrating a process flow for automatically generating and managing application directories of one or more applications associated with an entity, in accordance with an embodiment of the invention. As shown in block 510, the system identifies initiation of packaging of one or more program codes associated with at least one application. The at least one application may be any application that is being developed by the entity. A user may initiate packaging of the one or more program codes, via a tool (e.g., a Continuous Integration and Continuous Deployment (CICD) tool) used for deploying the one or more program codes into a testing environment or a production environment. In some embodiments, the user may provide one or more other files (e.g., manifest files, metadata files, libraries, scripts, static files, or the like) along with the one or more program codes while initiating the process of packaging. The system identifies initiation of packaging of the one or more program codes and initiates the process of generating and/or updating an application directory associated with the at least one application associated with the one or more program codes.

As shown in block 520, the system scans the one or more program codes to identify one or more parameters associated with the one or more program codes. The system may scan the one or more program codes to identify one or more parameters associated with the at least one application, where the one or more parameters are included in the application directory associated with the at least one application. The one or more parameters may provide information associated with functionalities provided by the one or more program codes. In some embodiments, the functionalities may be new functionalities. In some embodiments, the functionalities may be updates to existing functionalities.

As shown in block 530, the system identifies the one or more dependencies associated with the one or more program codes. Based on scanning the one or more program codes submitted by the user, the system identifies the one or more dependencies associated with the one or more program codes. For example, the system may identify that the one or more program codes are written in a program language and one or more libraries associated with the program language to execute the one or more program codes is identified as a dependency.

As shown in block 540, the system identifies the one or more screens associated with the one or more program codes. The one or more program codes may provide one or more screens associated with the functionalities being added to the at least one application and the system may identify the one or more screens. In some embodiments, the system may tap into a system or a utility that takes screenshots and may extract the screenshots associated with the one or more screens to include in the application directory.

As shown in block 550, the system identifies the one or more permissions associated with the one or more program codes. Based on scanning the one or more program codes, the system may identify one or more permissions required by the one or more program codes. For example, the system may identify that the program code submitted by a user may require access to Bluetooth to provide the one or more functionalities to the end users of the at least one application.

As shown in block 560, the system identifies the one or more services that are being added to the at least one application, via the one or more program codes. The one or more program codes may make service calls to one or more backend systems and may be implemented through networking layers. The system may identify an address URL associated with the service, type of request associated with the service call, type of response for the request, parameters sent with the service call, and the like associated with the one or more services associated with the one or more program codes.

As shown in block 570, the system identifies the one or more navigational parameters associated with the one or more program codes. Based on scanning the one or more program codes, the system may identify the navigational parameters comprising at least entry points and landing screens associated with one or more modules associated with the one or more program codes of the at least one application. For example, the system may determine that an overview page is a landing screen for accounts module associated with program code submitted by a user.

As shown in block 580, the system identifies the one or more base classes, the one or more logging frameworks, and the one or more static analyzers associated with the one or more program codes. The one or more base classes, the one or more logging frameworks, and the one or more static analyzers are associated with generating analytics related to statistics and usage associated with the one or more program codes of the at least one application.

In some embodiments, the system may also identify one or more functionalities associated with the one or more program codes provided by the user. In some embodiments, the one or more program codes submitted by the user may be associated with a single functionality. In some other embodiments, the one or more program codes submitted by the user may be associated with two or more functionalities. In some embodiments, the system may also identify sub-features associated with the one or more features/functionalities. In some embodiments, the system may also identify one or more feature switches associated with the one or more program codes, where the feature switches allow the users to activate and deactivate one or more functionalities associated with the one or more program codes with a single click functionality (e.g., without re-launching or re-deploying the one or more program codes). In some embodiments, the system may also identify one or more deep links that can be used to launch the at least one application based on scanning the one or more program codes.

As shown in block 590, the system generates an application directory associated with the at least one application. The system then generates the application directory comprising the one or more functionalities/features, one or more sub-features associated with each of the features, one or more dependencies, the one or more screens, the one or more feature switches, the one or more deep links, the one or more permissions, the one or more services, the one or more navigational parameters, the one or more base classes, the one or more logging frameworks, and one or more static analyzers. For example, if the program code submitted by the user is associated with an authentication module of the at least one application, the system may generate an application directory corresponding to the authentication module, where the application directory comprises screens, dependency libraries, feature switches (e.g., associated with turning ON or OFF one or more features without changing or re-launching the at least one application), list of deep links (e.g., URL's used to launch the at least one application), log in tags generated for the authentication module for analytics purposes, one or more services associated with the authentication module, permissions used in the authentication module, libraries and/or repositories used by the authentication module, or the like. The system may create a user interface to display the application directory to the one or more users. In some embodiments, the application directory may comprise one or more filters, where the one or more users may use the filters to get specific information associated with the at least one application. In some embodiments, the creation of the application directory is performed in parallel to the packing of the one or more program codes. In some embodiments, the system may constantly update the application directory based on new set of program codes received from the one or more users. For example, if the new set of program codes deletes a confirmation page from an authentication module of an application, the system updates the application directory by deleting at least a screenshot associated with the confirmation page and any other information associated with the confirmation page from the application directory.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for automatically generating and managing application directories of one or more applications associated with an entity, the system comprising:
   at least one network communication interface;
   at least one processing device; and
   at least one non-transitory storage device with computer-readable program code stored thereon and accessible by the at least one processing device, wherein the computer-readable code when executed is configured to cause the at least one processing device to:
   scan one or more program codes associated with at least one application to identify one or more parameters associated with the one or more program codes;
   automatically generate an application directory associated with the at least one application based at least on the one or more parameters identified by scanning the one or more program codes, wherein the one or more parameters comprise one or more dependencies, one or more screens, one or more permissions, one or more services, one or more navigational parameters, one or more base classes, one or more logging frameworks, and one or more static analyzers; and
   generate a user interface to display the application directory to one or more users.

2. The system of claim 1, wherein the non-transitory computer-readable medium further comprises code configured to cause the at least one processing device to:
   identify the one or more dependencies associated with the one or more program codes of the at least one application;
   identify the one or more screens associated with the one or more program codes of the at least one application;
   identify the one or more permissions associated with the one or more program codes of the at least one application;
   identify the one or more services that are being added to the at least one application, via the one or more program codes;
   identify the one or more navigational parameters associated with the one or more program codes of the at least one application; and
   identify the one or more base classes, the one or more logging frameworks, and the one or more static analyzers associated with the one or more program codes to monitor analytics of the at least one application.

3. The system of claim 2, wherein the non-transitory computer-readable medium further comprises code configured to cause the at least one processing device to:
   extract one or more screenshots associated with the one or more screens; and
   insert the one or more screenshots into the application directory.

4. The system of claim 2, wherein the non-transitory computer-readable medium further comprises code configured to cause the at least one processing device to identify the one or more permissions based on accessing one or more manifest files associated with the one or more program codes.

5. The system of claim 2, wherein the one or more navigational parameters comprise entry points and landing screens to one or more modules of the at least one application.

6. The system of claim 1, wherein the non-transitory computer-readable medium further comprises code configured to cause the at least one processing device to update the application directory based on an initiation of packing of a second set of program codes associated with the at least one application.

7. The system of claim 1, wherein the generation of the application directory is completed in parallel with packaging of the one or more program codes.

8. A computer program product for automatically generating and managing application directories of one or more applications associated with an entity, the computer program product comprising a non-transitory computer-readable storage medium having computer executable instructions for causing a computer processor to perform the steps of:
   scanning one or more program codes associated with at least one application to identify one or more parameters associated with the one or more program codes;
   automatically generating an application directory associated with the at least one application based at least on the one or more parameters identified by scanning the one or more program codes, wherein the one or more parameters comprise one or more dependencies, one or more screens, one or more permissions, one or more services, one or more navigational parameters, one or more base classes, one or more logging frameworks, and one or more static analyzers; and
   generating a user interface to display the application directory to one or more users.

9. The computer program product of claim 8, wherein the computer executable instructions cause the computer processor to perform the steps of:
   identifying the one or more dependencies associated with the one or more program codes of the at least one application;
   identifying the one or more screens associated with the one or more program codes of the at least one application;
   identifying the one or more permissions associated with the one or more program codes of the at least one application;
   identifying the one or more services that are being added to the at least one application, via the one or more program codes;
   identifying the one or more navigational parameters associated with the one or more program codes of the at least one application; and
   identifying the one or more base classes, the one or more logging frameworks, and the one or more static analyzers associated with the one or more program codes to monitor analytics of the at least one application.

10. The computer program product of claim 9, wherein the computer executable instructions cause the computer processor to perform the steps of:
extracting one or more screenshots associated with the one or more screens; and
inserting the one or more screenshots into the application directory.

11. The computer program product of claim 9, wherein the computer executable instructions cause the computer processor to perform the step of identifying the one or more permissions based on accessing one or more manifest files associated with the one or more program codes.

12. The computer program product of claim 9, wherein the one or more navigational parameters comprise entry points and landing screens to one or more modules of the at least one application.

13. The computer program product of claim 8, wherein the computer executable instructions cause the computer processor to perform the step of updating the application directory based on an initiation of packing of a second set of program codes associated with the at least one application.

14. The computer program product of claim 8, wherein the generation of the application directory is completed in parallel with packaging of the one or more program codes.

15. A computer implemented method for automatically generating and managing application directories of one or more applications associated with an entity, wherein the method comprises:
scanning one or more program codes associated with at least one application to identify one or more parameters associated with the one or more program codes;
automatically generating an application directory associated with the at least one application based at least on the one or more parameters identified by scanning the one or more program codes, wherein the one or more parameters comprise one or more dependencies, one or more screens, one or more permissions, one or more services, one or more navigational parameters, one or more base classes, one or more logging frameworks, and one or more static analyzers; and
generating a user interface to display the application directory to one or more users.

16. The computer implemented method of claim 15, wherein the method comprises:
identifying the one or more dependencies associated with the one or more program codes of the at least one application;
identifying the one or more screens associated with the one or more program codes of the at least one application;
identifying the one or more permissions associated with the one or more program codes of the at least one application;
identifying the one or more services that are being added to the at least one application, via the one or more program codes;
identifying the one or more navigational parameters associated with the one or more program codes of the at least one application; and
identifying the one or more base classes, the one or more logging frameworks, and the one or more static analyzers associated with the one or more program codes to monitor analytics of the at least one application.

17. The computer implemented method of claim 16, wherein the method comprises:
extracting one or more screenshots associated with the one or more screens; and
inserting the one or more screenshots into the application directory.

18. The computer implemented method of claim 16, wherein identifying the one or more permissions is based on accessing one or more manifest files associated with the one or more program codes.

19. The computer implemented method of claim 15, wherein the method further comprises updating the application directory based on an initiation of packing of a second set of program codes associated with the at least one application.

20. The computer implemented method of claim 15, wherein the generation of the application directory is completed in parallel with packaging of the one or more program codes.

* * * * *